United States Patent
Cain

(10) Patent No.: US 12,072,850 B2
(45) Date of Patent: Aug. 27, 2024

(54) VIRTUAL FILE SYSTEM FOR DYNAMICALLY PROVIDING MEDIA CONTENT

(71) Applicant: Grass Valley Limited, Newbury (GB)

(72) Inventor: James Westland Cain, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 17/815,438

(22) Filed: Jul. 27, 2022

(65) Prior Publication Data

US 2023/0031033 A1 Feb. 2, 2023

Related U.S. Application Data

(60) Provisional application No. 63/226,563, filed on Jul. 28, 2021.

(51) Int. Cl.
| | |
|---|---|
| *G06F 15/00* | (2006.01) |
| *G06F 16/11* | (2019.01) |
| *G06F 16/188* | (2019.01) |

(52) U.S. Cl.
CPC .......... *G06F 16/188* (2019.01); *G06F 16/116* (2019.01)

(58) Field of Classification Search
None
See application file for complete search history.

(56) References Cited

U.S. PATENT DOCUMENTS

2014/0122545 A1 5/2014 Cain et al.

FOREIGN PATENT DOCUMENTS

| AU | 2010250118 A1 | * | 12/2011 | ......... H04L 65/4084 |
|---|---|---|---|---|
| CA | 2869311 C | * | 2/2018 | ......... H01L 29/1075 |
| EP | 2810446 B1 | | 7/2018 | |
| WO | 2020254821 A1 | | 12/2020 | |

OTHER PUBLICATIONS

International Search Report and Written Opinion issued for Int'l Appl. No. PCT/GB2022/051985, Int'l Filing Date Jul. 28, 2022, mailed Jan. 10, 2023.

* cited by examiner

*Primary Examiner* — Tuankhanh D Phan
(74) *Attorney, Agent, or Firm* — ARENTFOX SCHIFF LLP

(57) ABSTRACT

A system that dynamically provides media essence to a client device. An I/O interface receives a media access request that defines a range of media content at a defined format, and a VFS generates an essence containing file that includes a file name and extension that identifies byte ranges for the content range and the defined format; dynamically builds the essence containing file to comprise APIs that can access at the identified byte ranges for the defined range of media content; imposes a structure on a portion of bytes contained in the essence containing file to define a processing function to be executed before delivering the essence to the client device; and opens the essence containing file to access the identified byte ranges using the APIs and causing the processing function to be executed on the accessed and identified byte ranges before delivering the essence to the client device.

22 Claims, 6 Drawing Sheets

VIRTUAL FILE SYSTEM FOR DYNAMICALLY PROVIDING MEDIA CONTENT

CROSS REFERENCE TO RELATED APPLICATIONS

The present application claims priority to U.S. Provisional Patent Application No. 63/226,563, filed Jul. 28, 2021, the entire contents of which are hereby incorporated by reference.

FIELD OF THE INVENTION

The present invention relates to media content distribution and, more particularly, to a system and method for dynamically generating essence containing files for distributing essence by a virtual file system to a client device.

BACKGROUND

FIG. 1 illustrates a conventional file system for providing content, such as media content, to a client device. As shown, the file system 1 includes a data store 2 that stores the data that forms the files stored in the file system 1. In implementation, a particular set of data in the data store 2 can include an identification tag, such as a globally unique identifier or "GUID". The file system 1 further comprises a file record database 3 that contains file records that store the details of the files in the data store 2 stored in the file system 1. That is, the file record database 3 stores the location (e.g., addresses) of the data in the data store 2 that forms the files and can also store other metadata such as creation date, file length, permission information and other attributes.

Access to the file system 1 by a client device 10, for example, is provided by a file system gateway 4 that can accept requests from the client device 10 to read/write files from the file system 1 and, in response, reads/writes data to/from the data store 2 based on the file records in the file record database 3. Similarly, the file system gateway 4 can accept requests from the client device 10 to read/write to the file records in the file record database 3 itself. The file system gateway 3 may be connected directly to a device (e.g., the client device 10), to a server, or alternatively to communicate with other devices over a network (e.g., as a file server or network-attached storage (NAS) device). Such a network may be a local area network (LAN) or a public network such as the Internet.

The file system 1 may, for example, be a media file store, in which case the data store 2 stores media data, such as video and audio data that is conventionally known as "essence" data. A file in the file system 1 may be made up of a single set of data from the data store 2 with a single GUID, as is conventionally the case. A file may also be a "clip" in which case the file is made up of portions of data from one or more sets of data in data store 2, with the details of how the clip is constructed being part of the details of the file stored in the file record in the file record database 3. Clips are generally created by manual editing of files already present in the file system 1.

In various infrastructures and business models (e.g., a media production environment and infrastructure), it is desirable to have a particular clip available in several different versions, for example, different file formats, sample rates and/or image sizes. However, a large amount of space is required to store the different version files, and the creation of the version files may require the processing of the essence data making up the original clip, which can be time consuming. In order to mitigate this, virtual file systems have been implemented.

FIG. 2 illustrates a conventional infrastructure for a virtual file system to provide data and content, such as media content. As shown, the virtual file system 20 is communicatively coupled to a plurality of devices, such as client device 10 and/or server 12 for receiving data access request (as well as write requests in some aspects). When queried, the virtual file system 20 can determine and indicate that it has several different version files available. However, the different version files are not in fact explicitly stored in the file system, but instead the contents of the version files are created and/or accessed only as and when requested. For example, the virtual file system 20 can include (or be coupled to) a local file system 30 that can locally access the requested data from a physical disk 32, for example. Alternatively (or in addition thereto), the virtual file system 20 can be coupled to a remote file system 40 that can access the requested content from a network 42, for example, that may be coupled to additional storage devices (e.g., video servers) in the network.

Virtual file systems, such as virtual file system 20 shown in FIG. 2, are able to provide several different version files while avoiding the problems of the required storage space and time taken to create in advance all versions that may be requested. However, which versions are to be provided must be set in advance, as this determines the version files that the file system indicates are present (or otherwise available) when queried.

United Kingdom Patent Application No. 1105976.3, filed Apr. 7, 2011, entitled "Improvements Relating to File Systems", the contents of which are hereby incorporated by reference, discloses one system that creates and/or accesses requested media content from a client device based on the syntax of the request received from the client device. In particular, the system disclosed therein creates a file handle based on the syntax of the request that refers to the file record stored in a file record database (e.g., disk 32 of FIG. 2) and in a desired format. To access the content, a filepath (which can be derived from the file handle) can be translated to the requested byte range that can be parsed by the virtual file system to access and provide the content.

However, there are a number of problems and technical limitations presented when opening a file using a filepath, including: (i) access to the file requires that the software is physically close to the media storage; (ii) the software gets hooked on the format that the essence is presented in; (iii) there is no ability to add any processing steps between the contents of the file and the application making the byte range available; and (iv) the filepath is in effect a proxy for the identity of the media. In other words, the filepath may be added to any project files whenever the media is used in an editor timeline. Therefore, the filepath—which ingrains the form and location of the media—ties any project file references to exactly that, i.e., the current form and location of the media.

The media production industry has attempted to mitigate the impact of these issues with using filepaths to provide access to media content. For example, client applications that have been adapted to support multiple filepaths concurrently, hybrid proxy/quality workflows have been enabled, and/or clever WAN optimized file transfer technologies have been created, so that distant files can quickly be copied locally allowing for low latency access. However, each of these implementations (e.g., using the virtual file system 20 shown in FIG. 2) have increased complexity, as multiple file copies need to be tracked, for example, for the video editor as project files need to be conformed each time anything gets copied. To further counter these issues, many expensive workflow practices have been created, such as copying all media between numerous sites in a customer's facilities just in case it is needed. Of course, this policy incurs exponential cost as sites increase in number.

SUMMARY OF THE INVENTION

The exemplary embodiments of the present invention seek to mitigate the above-mentioned problem and to provide an improved, more flexible virtual file system that can dynamically create files of media essence comprising content that is specified by a client device. Using the exemplary system and method disclosed herein, client applications can choose the quality of any essence on a frame-by-frame basis, which empowers all edge devices by offering global scalability and truly novel workflows. Moreover, client applications can also ask for arbitrary ranges of essence, for example, by asking for a single GOP (group of pictures) from the middle of a two-hour record, and even from the other side of the planet, using the system and method disclosed herein, which saves time and eliminates the waste of resources.

Thus, according to an exemplary aspect, a method is provided for dynamically providing media essence to a client device. In this aspect, the method includes receiving, by a virtual file system (VFS), a media access request from a client device that defines a range of media content at a defined format for the essence to be delivered to the client device; generating, by the VFS, an essence containing file that includes a file name and extension that identifies byte ranges for the defined range of media content and the defined format for the delivering the essence to the client device; dynamically building, by the VFS, the essence containing file to comprise a plurality of application programming interfaces (APIs) that are each configured to access at least a portion of the identified byte ranges for the defined range of media content; imposing, by the VFS, a structure on a portion of bytes contained in the essence containing file to define at least one processing function for the identified byte ranges to be executed before delivering the essence to the client device; and subsequently opening, by the VFS, the essence containing file to access the identified byte ranges for the defined range of media content using the plurality of APIs and causing the at least one processing function to be executed on the accessed and identified byte ranges before delivering the essence to the client device. Moreover, in an exemplary aspect, the at least one processing function is configured to transcode or transform the media content to the defined format for the essence that is defined by the media access request received from the client device.

In another exemplary aspect, the method includes imposing the structure to include at least one programming statement to offload the at least one processing function to be executed by a computing device that is remote to the VFS before delivering the essence to the client device.

In another exemplary aspect, the at least one processing function comprises at least one of a video editing function or a mix effect function.

In another exemplary aspect, the method includes defining the media access request to include a CreateFile command that defines the format for the requested range of media content to be at least one of an MXF file format, a JPEG file format, a PNG file format and a WAV file format. Moreover, the method can include dynamically and on-the-fly replacing a portion of the media access request by an identification that specifies a location of a source of the identified byte ranges for the defined range of media content. Yet further, the method can include configuring the identification to carry at least one URL that is configured to access the location of the source to obtain the identified byte ranges for the defined range of media content.

In another exemplary aspect, the method includes generating a pre-queue by the media access request that specifies a range of source content for the defined range of media content that is scheduled to be captured at a live event.

Moreover, according to another exemplary aspect, a system is provided for dynamically providing media essence to a client device. In this aspect, the system includes an input/output interface configured to receive a media access request from a client device that defines a range of media content at a defined format for the essence to be delivered to the client device; and a virtual file system (VFS) coupled to the input/output interface and including a processor configured to implement instructions on a memory so as to configure the VFS to generate an essence containing file that includes a file name and extension that identifies byte ranges for the defined range of media content and the defined format for the delivering the essence to the client device; dynamically build the essence containing file to comprise a plurality of application programming interfaces (APIs) that are each configured to access at least a portion of the identified byte ranges for the defined range of media content; impose a structure on a portion of bytes contained in the essence containing file to define at least one processing function for the identified byte ranges to be executed before delivering the essence to the client device; and open the essence containing file to access the identified byte ranges for the defined range of media content using the plurality of APIs and causing the at least one processing function to be executed on the accessed and identified byte ranges before delivering the essence to the client device. In this aspect, the at least one processing function is configured to transcode or transform the media content to the defined format for the essence that is defined by the media access request received from the client device.

In another exemplary aspect of the system, the VFS is further configured to impose the structure to include at least one programming statement to offload the at least one processing function to be executed by a computing device that is remote to the VFS before delivering the essence to the client device.

In another exemplary aspect of the system, the at least one processing function comprises at least one of a video editing function or a mix effect function.

In another exemplary aspect of the system, the VFS is further configured to define the media access request to include a CreateFile command that defines the format for the requested range of media content to be at least one of an MXF file format, a JPEG file format, a PNG file format and a WAV file format. Moreover, the VFS is further configured to dynamically and on-the-fly replace a portion of the media access request by an identification that specifies a location of a source of the identified byte ranges for the defined range of media content. Yet further, the VFS is further configured to configure the identification to carry at least one URL that is configured to access the location of the source to obtain the identified byte ranges for the defined range of media content.

In another exemplary aspect of the system, the VFS is further configured to generate a pre-queue in response to the media access request that specifies a range of source content for the defined range of media content that is scheduled to be captured at a live event.

In addition, according to another exemplary aspect, a system is provided for dynamically providing media essence to a client device. In this aspect, the system includes an input/output interface configured to receive a media access request from a client device that defines a range of media content at a defined format for the essence to be delivered to the client device; and a virtual file system (VFS) coupled to the input/output interface and including a processor configured to implement instructions on a memory so as to provide an essence distribution controller that generates an essence containing file that includes a file name and extension that identifies byte ranges for the defined range of media content and the defined format for the delivering the essence to the client device; dynamically builds the essence containing file to comprise a plurality of application programming interfaces (APIs) that are each configured to access at least a portion of the identified byte ranges for the defined range of media content; imposes a structure on a portion of bytes contained in the essence containing file to define at least one processing function for the identified byte ranges to be executed before delivering the essence to the client device; opens the essence containing file to access the identified byte ranges for the defined range of media content using the plurality of APIs and causing the at least one processing function to be executed on the accessed and identified byte ranges before delivering the essence to the client device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
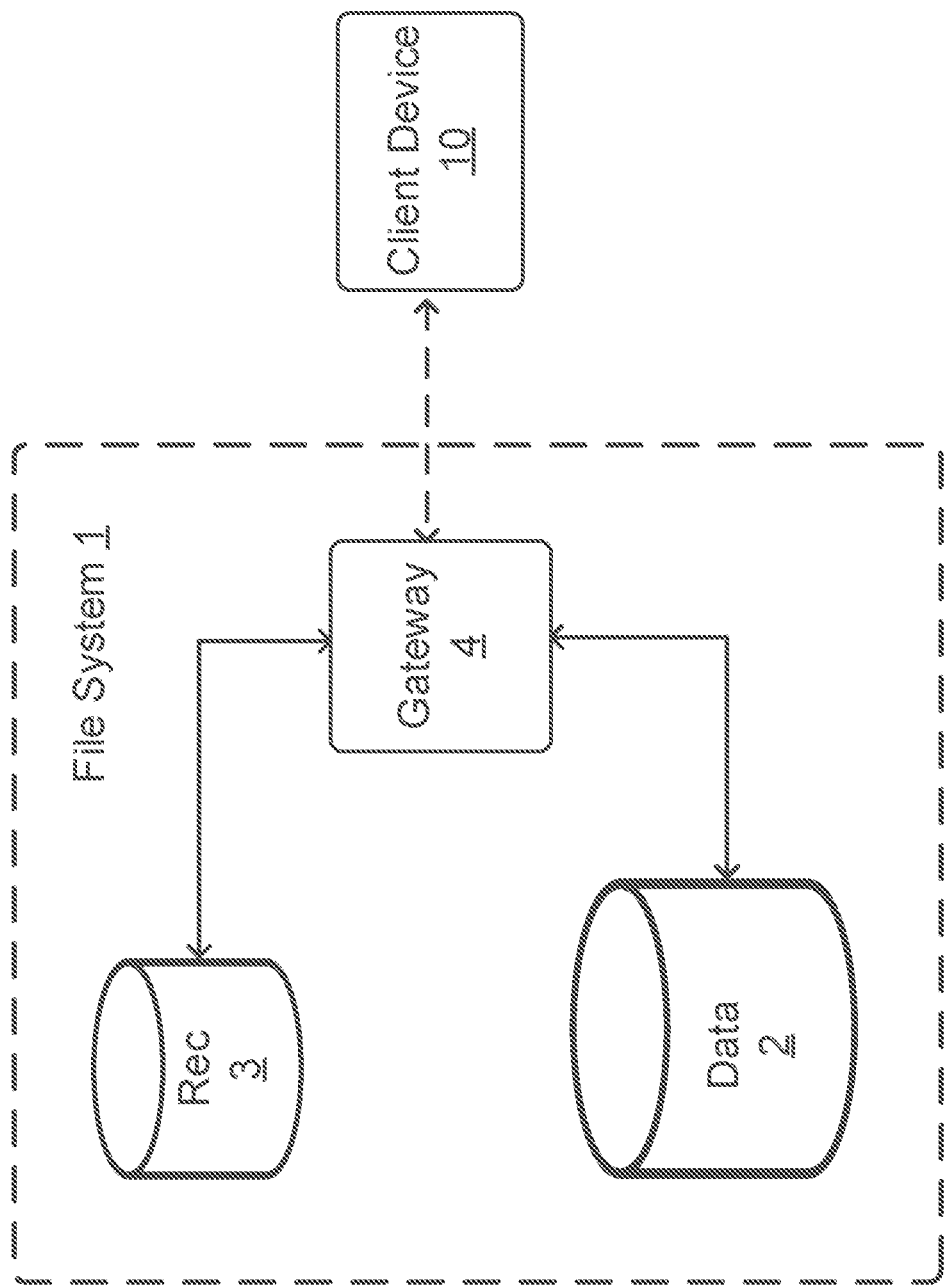
FIG. 1 illustrates a conventional file system for providing content, such as media content.
Figure 2:
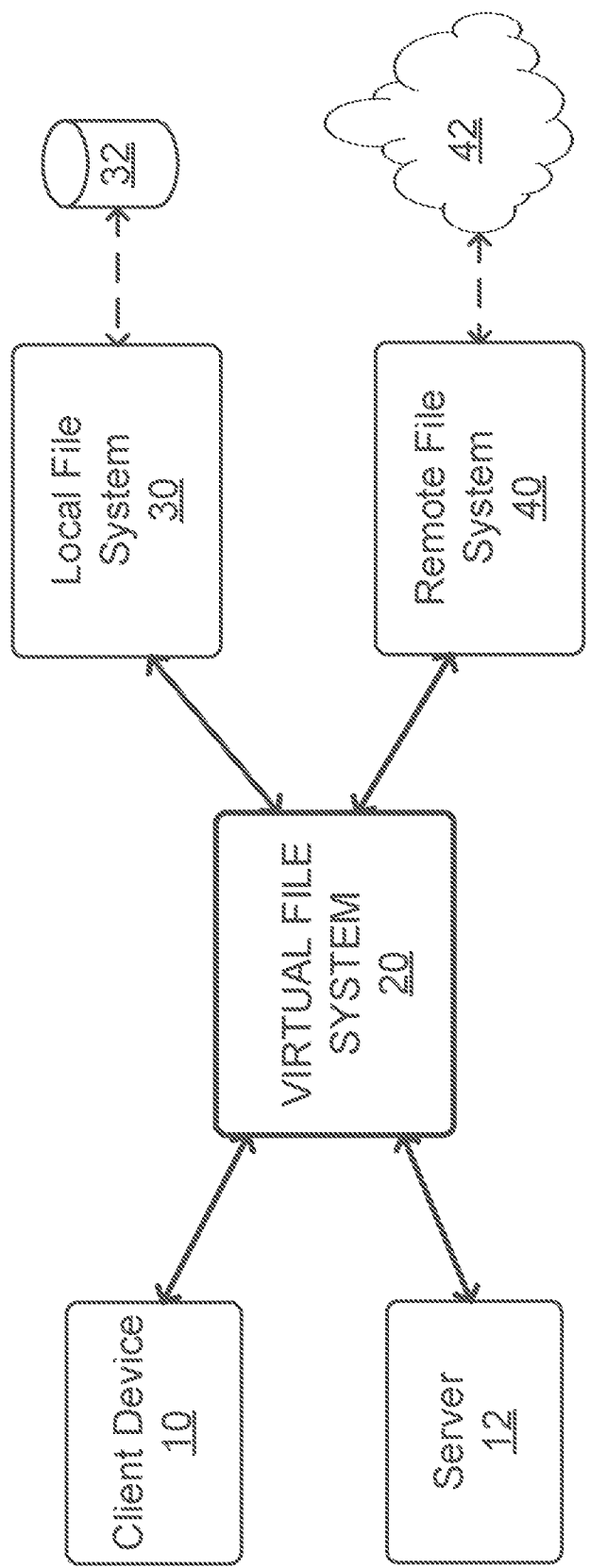
FIG. 2 illustrates a conventional infrastructure for a virtual file system to provide data and content, such as media content.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, the system and method disclosed herein is constructed for dynamically generating essence containing files for distribution by a virtual file system to a client device. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

According to an exemplary aspect and for purposes of this disclosure, essence can generally be considered to be media content or media assets, such as any type of media file, including media, video, audio, captions or the like, that can be consumed by a content consuming device. In general, payloads of essence (i.e., media content) are considered to be "grains" (i.e., the units of essence) that are made available by one or more flows for a source of media content. According to an exemplary aspect, grains each comprise at least one of a video frame, a group of pictures of video, audio samples and ancillary data of media content. Moreover, grains have a known identity and set format. A source has a plurality of flows that each contains a plurality of grains, and with each flow being grains of a different formats. A flow is essentially a mapping between time and grains and a contiguous group of one or more grains is called a range. The set of grains made available by a given flow can be one or more ranges. The units of a range are measured in time, and, therefore, a range can be defined by a duration with a start time and an end time. By inference, a grain also has a range even so for a single grain or payload of media essence. The virtual file system described herein provides a method for dynamically providing grains and flows available to a client device while hiding the form and location of the requested essence.

Figure 3:
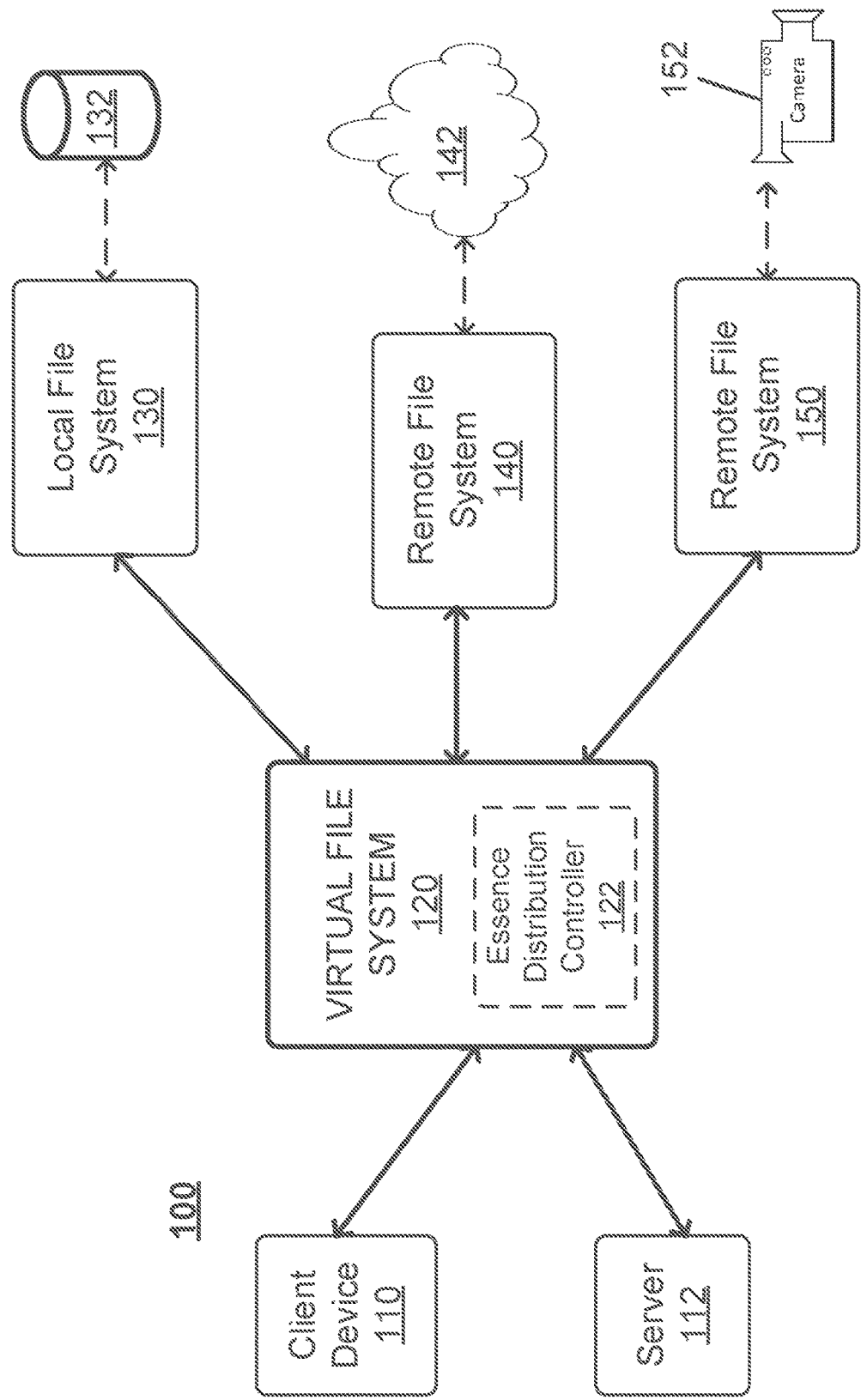
FIG. 3 illustrates a block diagram of a system for dynamically generating essence containing files for distribution to a client device by a virtual file system according to an exemplary embodiment.

FIG. 3 illustrates a block diagram of a system for dynamically generating essence containing files for distribution by a virtual file system to a client device according to an exemplary embodiment. As generally shown, the system 100 includes a virtual file system 120 that can be communicatively coupled (e.g., over a network, such as a cloud based network) to one or more devices requesting specific media content (e.g., a specific range of grains) in a desired format. For example, the requesting device can be a client device 110 running a client application, such as a media content editor (e.g., Adobe Premier®), for editing media content as part of a media production. In another example, the requesting device can be a server 112 configured to request media content for subsequent distribution (e.g., as part of a media production workflow) as would be understood to one skilled in the art.

In one exemplary aspect of the system and method disclosed herein, plugin APIs (application programming interfaces) can be exploited for importing the requested files of content. For example, Adobe Premiere® offers a rich plugin environment to enable new file formats to be accessed by the editor. In this aspect, plugins can be created that are configured to use the URLs to acquire grains of essence in the best form available for the current use. Moreover, pre-queuing algorithms and local disk-based caching can be used to enable the client device to not know it is accessing media over HTTP. The quality and format of the content can also be varied, with such rendering offloaded (e.g., the a cloud compute operation controlled by the virtual file system 120). Effectively and as will be described in more detail below, the essence containing files created by the virtual file system 120 do not need to be conformed as they are moved—globally—as they contain no references to physical media and are not constrained by material form or location. Effectively, the fact that media quality or relocation of media sources is changed is hidden from client applications.

According to the exemplary embodiment, the virtual file system 120 includes an essence distribution controller 122 that is configured to generate and distribute essence containing files that any application (e.g., editing applications running on client device 110) can open, for example, using the plugin APIs as discussed above. In general, the essence containing file can specify a format such as MXF, JPEG, PNG, WAV files, and the like, as long as the specified file format is in the context of essence (i.e., video, audio and/or ancillary content) for purposes of the present disclosure.

As will be described in greater detail below, the essence distribution controller 122 is configured to dynamically create the essence containing files "to order" using streaming APIs. Effectively, these made "to order" files appear to be real files, except that the essence distribution controller 122 creates these files "on the fly" and adapts these files to have their content adapted from the streaming source into a form that is suitable for local consumption by the requesting client device. Advantageously, all issues (e.g., form, location and processing) are in effect hidden from the client device using the inventive method. As a result, the system can dynamically provide essence to a user in response to a media access request specifying the media identity that they require, for example, in the form of a filepath. The essence distribution controller 122 is configured to dynamically adjust the format and the range of grains by altering the file name and extension that the client opens. In one exemplary aspect, the request file format is specified according to the requested file extension of the media access request. For example, an .MXF extension will specify that an MXF file containing video and/or audio content should be created by the essence distribution controller 122, for example.

As further shown in FIG. 3, system 100 includes the virtual file system 120, which can be configured as an abstract layer on top of a more concrete file system, such as local file system 130, which is in turn is coupled to a plurality of physical disks 132 for storing media content (i.e., essence). The virtual file system 120 is configured to enable a client application (e.g., on client device 110, such as the video editing software) to access different types of concrete file systems in a uniform way. Thus, the concrete file system can include local file system 130, but also (or separately) one or more remote file systems. For example, remote file system 140 can be remotely and communicatively coupled over a network (e.g., the Internet) and even be located in a cloud computing infrastructure, such as network 142. In this aspect, the virtual file system 120 can be configured to access essence from different remote platforms (e.g., on network 142). Yet further, remote file system 150 can be provided and coupled to, for example, a video production camera 152 to store live media content as it is dynamically captured by camera 152 in a real-time environment at a venue, such as a live sporting event, news broadcast, or the like.

In operation, the essence distribution controller 122 is configured to receive a media access request from client device 110 and/or server 112 and to generate an essence containing file (e.g., an MXF file) that includes requested essences in a desired form and quality, as specified by the media access request. As will be discussed in greater detail below, any processing can be advantageously offloaded from the client application and performed before the essence is delivered to the client application for consumption.

Figure 4:
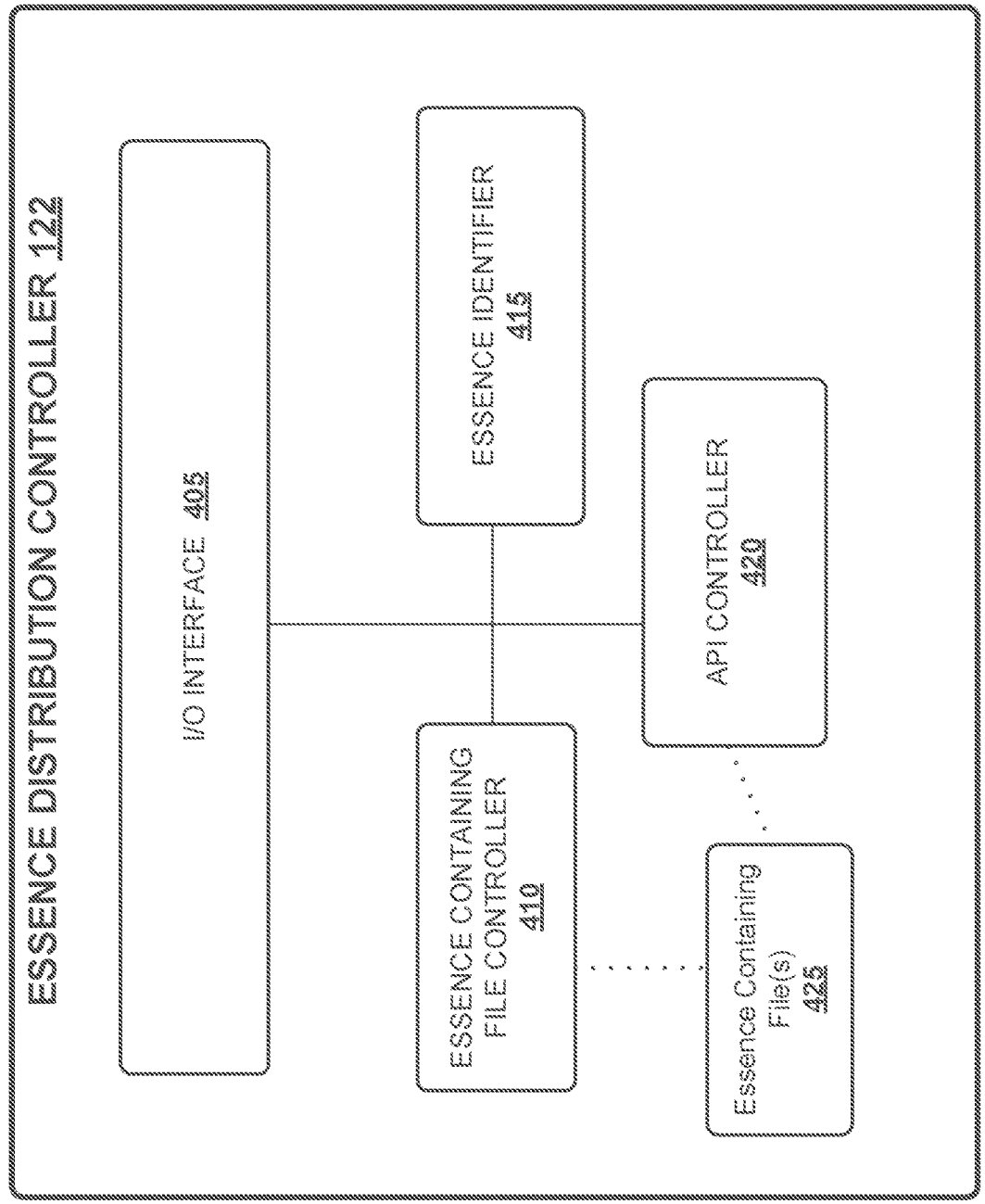
FIG. 4 illustrates a block diagram of an essence distribution controller implemented in the virtual file system shown in FIG. 3 that is provided for dynamically generating essence containing files for distribution to a client device by a virtual file system according to an exemplary embodiment.

FIG. 4 illustrates a block diagram of an essence distribution controller 122 implemented in the virtual file system 120 shown in FIG. 3 that is provided for dynamically generating essence containing files 425 for distribution to a client device by a virtual file system according to an exemplary embodiment. In general, the essence distribution controller 122 corresponds to the essence distribution controller 122 of the virtual file system 120 as described above with respect to FIG. 3 and can be implemented using a combination of hardware and/or software components or "module" that are configured to execute the algorithms described herein.

For purposes of this disclosure, the term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

According to the exemplary aspect, the essence distribution controller 122 includes I/O interface 405 configured to receive media access requests from client devices, for example, and also distribute essence containing files 425 to the client devices (or servers) in response to the media access requests. In addition, the I/O interface 405 can further be configured to access essence from file systems, such as the local file system 130 and/or remote file systems 140 and 150.

In general, the client device 110 or server 112 is configured to communicate data packets (e.g., that can be considered in the form of a media access request) that carry messages containing requests to call certain APIs, such as: CreateFile/OpenFile, ReadFile, WriteFile, CloseFile, ListFiles, and the like. The virtual file system 120 and specifically the essence distribution controller 122, is configured receive these packets and to dynamically build a packet(s) to put on the network to respond to each request. As discussed above, these functions are advantageously implemented by the virtual file system 120, such that the client application does not know this is not a conventional file system.

As further shown, the essence distribution controller 122 includes an essence containing file controller 410 that is configured to receive and/or process the media access request from the client device 110 (or server 112) that defines a range of media content at a defined format for the essence to be delivered to the client device. In an exemplary aspect, the media access request includes a command for a CreateFile("<guid>.mxf"), where the requested file can be a material exchange format (MXF) file for digital video and audio media essence, for example. The essence containing file controller 410 can be configured to replace the <guid> as specified in the request by an actual ID that specifies to the virtual file system 120 the location of the source where the requested range of media essence is to be accessed. For example, the ID of source content can be a memory access location (e.g., address(es)) one or more of the local file system 130, remote file system 140 and/or remote file system 150. In one aspect, the media access request can even specify a range of source content that is scheduled to be captured at a live event, but not yet even captured by camera 152, for example. The CreateFile operation also returns a FileHandle that can be used in later functions to specify the requested file. Moreover, in one exemplary aspect, the essence distribution controller 122 includes an essence identifier 415 that is configured to determine the location of the requested essence and generate the ID for the source content accordingly. More particularly, the identity for the source content can be inferred from the folder or filename. For example:
\\<hostname>\<share>\01F3Z436KSWGCS12301R09305 F\10jpeg—the folder is an ID, the filename is a frame number. Moreover, referring back to the example discussed above, when the system uses <guid>, the ID was the filename.

The essence identifier 415 can be configured to provide access to the requested media content by secure streaming style URLs that again hide the form and location of the originating source. This configuration enables significant freedom and flexibility to relocate the content from an on-premises recording to a cloud hosted object store, for example, that can be configured as long-term archive. To do so, the essence identifier 415 is configured to track where copies of the files (and media essence) are located and to locate sources of the essence for the most appropriate copy (e.g., based on requested format and quality). This can be achieved by a simple locations store (maintained by the essence identifier 415) that keeps an index of what copy, at what rendition, is stored where. That is, the essence identifier 415 keeps track of copies of essence in their various forms and locations. As described above, the same media is associated with a single identity—that can be referenced by the virtual file system 120—also using the IDs as described above. The actual copy of essence that is accessed will depend upon runtime calculations that may include access cost, round trip time, network load, quality constraints and other such metrics and parameters as requested by the client device. The identification (source ID) carries the respective URLs to make its access requests and the essence identifier 415 can then use a simple database query (of the index) to find the most suitable from and location of media to read from, which can be based on these controlling metrics and parameters.

Moreover, according to the exemplary embodiment, the essence containing file controller 410 is further configured to generate an essence containing file(s) 425 that defines a file name and extension that identifies byte ranges for the defined range of media content and also the defined format for the delivering the essence to the client device. In one aspect, the essence containing file controller 410 uses the CreateFile to add a file into a directory of the virtual file system 120 that has a file size in bytes, a creation time and other related metadata. The created essence containing files are then stored by the virtual file system 120 until a client device subsequently requests the content as part of an editing workflow or similar operation, for example. In one aspect, the folder location provides a context for the file that can affect what the file offers or how the file is processed. More specifically, the total file path (including all parent folders) as available to the virtual file system 120 provides a context for how to handle the file processing.

Furthermore, the essence distribution controller 122 includes an API controller 420 that is configured to dynamically build the essence containing file 425 to include a plurality of application programming interfaces (APIs) that are each configured to access at least a portion of the identified byte ranges (using the generated source IDs) for the defined range of media content. In operation, the API controller 420 dynamically builds the essence containing file 425 only after the I/O interface 405 receives a first call to ReadFile for the essence containing file 425. As described above, the APIs included in the essence containing file 425 can be configured to access a range of bytes (corresponding to the requested essence) from a remote source. Thus, according to the exemplary aspect, the file is dynamically created/modified by the API controller 420 to contain programming statements and/or functions for processing the requested essence.

The essence containing file controller 410 is further configured to impose a structure on a portion of bytes contained (or referenced to) in the essence containing file 425 to define one or more one processing function for the identified byte ranges to be executed when the essence is delivered to the client device 110 and/or server 112. The processing functions can be, for example, processing functions typically performed for media content, such as transcoding, compressing, encoding, transforming, and the like, the media content to be converted or otherwise defined in the requested format for the client device, even if the request format of the essence does not currently exist. Other examples of processing functions can be any type of editing, processing, mix effect function, or the like, that can be performed on media content in the context of a media production, for example. Such operations can include, a wipe, copy, convert, paint, stamp, stampa additive, mix effective, gain, size, shear, blur, mosaic, color/and/or blend operation. In this context, the essence distribution controller 122 can be configured as the actual deployment of a media processing event in a workflow, which could be carried out at any node, in addition to the respective node of either the client or the essence location. For example, the essence distribution controller 122 can be configured to deploy a processing function as described in U.S. patent application Ser. No. 17/351,793, entitled "System and Method for Optimizing Deployment of a Processing Function in a Media Production Workflow", the entire content of which are hereby incorporated by reference.

In order to reply to the ReadFile request, the essence containing file controller 410 is configured to place the correct essence payload in the correct form (e.g., by performing the desired processing function) in the correct location in the byte ranges set forth in the ReadFile request. In general, the processing functions can be performed by a render engine within the processing pipeline of the virtual file system 120. In an exemplary aspect, the processing functions can offer sizing semantics, for example, a filename might include a desired XY size for a picture. In addition (or alternatively), the same media can be offered with different file extensions, so offering a PNG or a JPEG implies different processing functions need to be executed to create the correct content for the requested device. To do so, one or more render engine can perform the required processing function, which includes stamping one picture on to another (including an optional alpha channel), sizing, cropping, shearing, coloring and the like.

Thus, in an exemplary aspect, if the essence containing file 425 is specified to be an MXF file, for example, the file can be comprises as a SourceGroup with each track being source that only offers one flow of grains. In this aspect, the flows represent the indexes in the MXF file that provide access for the virtual file system 120 to the byte ranges for the requested essence. In one aspect, the indexes in the file can be configured as restful APIs, enabling streaming of the requested content from one or more web servers, for example. More particularly, the virtual file system 120 and the one or more web servers can call each other, which is an example of stream-file duality. Thus, the virtual file system 120 can use a web server to source (by the APIs) the grains it will use as a source in its offering a virtual file, so the web server is effectively an end point the virtual file system 120 calls to access the required grains for the client media access request.

As a result, the fact that the media is currently stored in an MXF file is not known to the client device. Moreover, the client device is hidden from the fact that more than one copy of the content may exist, that some parts may have been transcoded into proxy, that some locations are cloud stores and that some proxy is only created on the fly when requested.

Advantageously, these processing functions are controlled by APIs specified in the essence containing file 425 and as defined by the virtual file system 120 before the file is delivered to the client device. By doing so, the client device (e.g., device 110) can choose the quality and range of essence with form and location be hidden from the client device and with the APIs being queried based on the identity of the requested media content. Moreover, one or more of the processing functions typically performed by the client application and now are being pushed to the virtual file system 120. Accordingly, when the virtual file system 120 is instructed to fetch data (e.g., in response to a ReadFile request), the APIs include functions (e.g., transcode) enabling the virtual file system 120 to control execution of additional processing functions on the requested essence before delivering the media essence to the client device.

Moreover, the ReadFile API can specify the FileHandle and byte range to be accessed. Thus, the virtual file system 120 (e.g., essence containing file controller 410) is configured to subsequently open the essence containing file 425 to access the identified byte ranges for the defined range of media content using the plurality of APIs and also cause the one or more processing function to be executed on the accessed and identified byte ranges before delivering the essence to the client device 110 and/or server 112.

Thus, according to the exemplary aspect, the essence distribution controller 122 is effectively configured to offer an essence containing file 425 (e.g. a MFX file) in response to the CreateFile function, but the file is only dynamically built as it is subsequently consumed by the requesting client application or device. Effectively, the virtual file system 120 is purporting to be typical remote data storage, but may have no disks and is instead be configured as one or more compute functions so the client application believes there is a storage system, but the computing uses APIs to pull media from other (e.g., remote) locations and also (optionally if needed) perform the processing functions on the requested content. In this aspect, the essence distribution controller 122 is configured to constitute bytes within a binary byte range to meet the file format specification with the payload of the file (i.e., the media essence) being supplied as flows and grains that are essentially supplied by restful APIs dynamically built into the file. Moreover, the restful APIs can be configured to supply the content after optionally transcoding and/or transforming the grains before delivery to the requesting client application. In an exemplary aspect, the virtual file system 120 is considered stateless, but with a defined framework having a state (i.e., a configuration in time) that executes in time to satisfy the media access request.

In a refinement of the exemplary aspect, the virtual file system 120 is configured to pre-queue the requested media content, even if the content has not yet been generated. Thus, during the midst of a live sport event, for example, a client application can request the first 20 minutes of the event, even if the subsequent timing of the event has not yet been recorded/captured. The virtual file system 120 can be configured to pre-queue the requested media content and delaying the processing until captured media essence is ripe for processing and distribution to the requesting client application. In this context, a delay in returning the result of a request to a file in effect inverts the control of the media processing in the system. By allowing client devices to run at full speed, processing the contents of a file and then delaying replies if the virtual file system 120 reaches media that has yet to be recorded, the system enables the client device to "track" the record head of the ingesting media.

Advantageously, this result allows the client device to finish processing the content just moments after the media has finished recording.

According to the exemplary system 100 described above with respect to FIG. 3 and utilizing the essence distribution controller 122 as shown in FIG. 4, media essence can be ingested anywhere of which the media can be stored in the cloud or on premises. Accordingly, the system for dynamically generating essence containing files for distribution to the client device operates scalably and globally since the hiding of the material from and the essence location enables global workflows. Moreover, by removing the hegemony of the filepath, the exemplary system frees media workflows from being constrained by the walls of a building. Instead, media location is tracked and made available without changing the media's identity. As a result, client applications (e.g., media editors) no longer need to track many different filepaths to enable proxy/quality hybrid workflows, as this facility is built into the access methods that the API plugins the editors host now use. Instead of having many isolated islands of media production, with little ability to join them together into a cohesive workflow, the system enables a media mesh with full unfettered access to those media storing nodes with the correct credentials.

Figure 5:
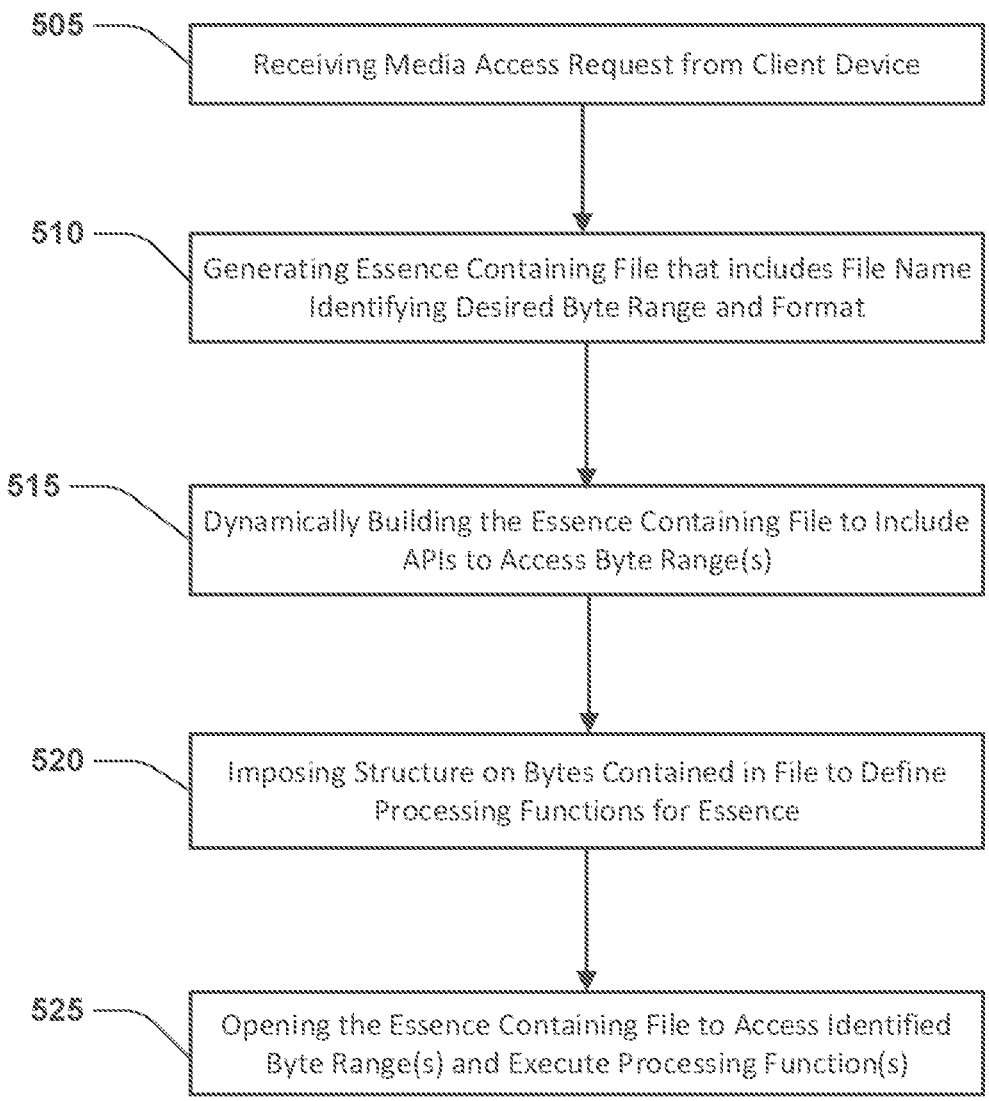
FIG. 5 illustrates a flowchart for a method for dynamically generating essence containing files for distribution to a client device by a virtual file system according to an exemplary embodiment.

FIG. 5 illustrates a flowchart for a method for dynamically generating essence containing files for distribution to a client device by a virtual file system according to an exemplary embodiment. In general, it should be appreciated that the method 500 shown in FIG. 5 can be performed using the systems, components and sub-components and modules described above with respect to FIGS. 3 and 4.

Initially, at step 505, the virtual file system 120 receives a media access request from a client device that defines a range of media content at a defined format for the essence to be delivered to the client device. In response to this request, the virtual file system 120 generates an essence containing file at step 510 that includes a file name and extension that identifies byte ranges for the defined range of media content and the defined format for the delivering the essence to the client device. Moreover, at step 515, the virtual file system 120 dynamically builds the essence containing file to comprise a plurality of application programming interfaces (APIs) that are each configured to access at least a portion of the identified byte ranges for the defined range of media content. Subsequently, at step 520, the virtual file system 120 imposes a structure on a portion of bytes contained in the essence containing file to define at least one processing function for the identified byte ranges to be executed before delivering the essence to the client device. Finally, the virtual file system 120 can open the essence containing file to access the identified byte ranges for the defined range of media content using the plurality of APIs and also cause the at least one processing function to be executed on the accessed and identified byte ranges before delivering the essence to the client device.

Figure 6:
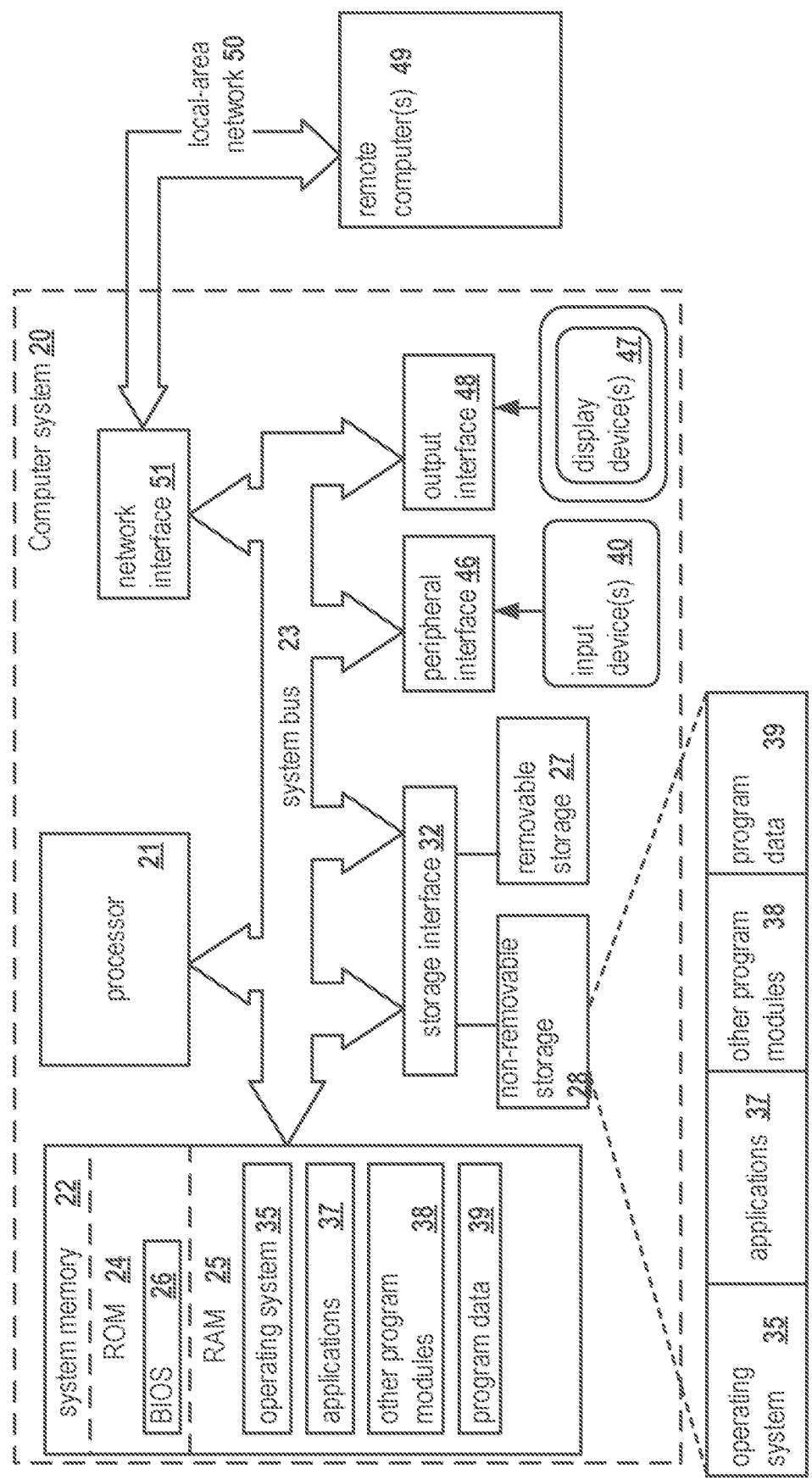
FIG. 6 is a block diagram illustrating a computer system on which aspects of systems and methods for dynamically generating essence containing files for distribution to a client device by a virtual file system according to an exemplary embodiment.

FIG. 6 is a block diagram illustrating a computer system on which aspects of systems and methods for dynamically generating essence containing files for distribution to a client device by a virtual file system according to an exemplary embodiment. In general, it should be noted that the computer system 20 can correspond to any computing system configured to execute the essence distribution controller 122 of virtual file system 120 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more remote storage devices 27 can correspond to local file system 130, remote file systems 140 and 150, and the components coupled thereto.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote client devices as described above with respect to FIG. 3 or, in the alternative, to one or more of the local file system 130, remote file systems 140 and 150, and the components coupled thereto.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for dynamically providing media essence to a client device, the method comprising:
    receiving, by a virtual file system (VFS), a media access request from a client device that defines a range of media content at a defined format for the media essence to be delivered to the client device, wherein the VFS is configured to dynamically provide grains and flows available to the client device while hiding, from the client, a form and location of the media essence to be delivered;

generating, by the VFS, an essence containing file that includes a file name and extension that identifies byte ranges for the defined range of media content and the defined format for the delivering of the essence to the client device;

dynamically building, by the VFS, the essence containing file to comprise a plurality of application programming interfaces (APIs) that are each configured to access at least a portion of the identified byte ranges for the defined range of media content;

imposing, by the VFS, a structure on a portion of bytes contained in the essence containing file to define at least one processing function for the identified byte ranges to be executed before delivering the essence to the client device; and subsequently opening, by the VFS, the essence containing file to access the identified byte ranges for the defined range of media content using the plurality of APIs and causing the at least one processing function to be executed on the accessed and identified byte ranges before delivering the essence to the client device, wherein the at least one processing function is configured to transcode or transform the media content to the defined format for the essence that is defined by the media access request received from the client device.

2. The method according to claim 1, further comprising imposing the structure to include at least one programming statement to offload the at least one processing function to be executed by a computing device that is remote to the VFS before delivering the essence to the client device.

3. The method according to claim 2, wherein the at least one processing function comprises at least one of a video editing function or a mix effect function.

4. The method according to claim 1, further comprising defining the media access request to include a CreateFile command that defines the format for the requested range of media content to be at least one of an MXF file format, a JPEG file format, a PNG file format and a WAV file format.

5. The method according to claim 4, further comprising dynamically and on-the-fly replacing a portion of the media access request by an identification that specifies a location of a source of the identified byte ranges for the defined range of media content.

6. The method according to claim 5, further comprising configuring the identification to carry at least one URL that is configured to access the location of the source to obtain the identified byte ranges for the defined range of media content.

7. The method according to claim 1, further comprising generating a pre-queue by the media access request that specifies a range of source content for the defined range of media content that is scheduled to be captured at a live event.

8. A system for dynamically providing media essence to a client device, the system comprising:

an input/output interface configured to receive a media access request from a client device that defines a range of media content at a defined format for the media essence to be delivered to the client device; and a virtual file system (VFS) coupled to the input/output interface and including a processor configured to implement instructions on a memory so as to configure the VFS to:

generate an essence containing file that includes a file name and extension that identifies byte ranges for the defined range of media content and the defined format for the delivering the essence to the client device;

dynamically build the essence containing file to comprise a plurality of application programming interfaces (APIs) that are each configured to access at least a portion of the identified byte ranges for the defined range of media content;

impose a structure on a portion of bytes contained in the essence containing file to define at least one processing function for the identified byte ranges to be executed before delivering the essence to the client device; and open the essence containing file to access the identified byte ranges for the defined range of media content using the plurality of APIs and causing the at least one processing function to be executed on the accessed and identified byte ranges before delivering the essence to the client device, wherein the at least one processing function is configured to transcode or transform the media content to the defined format for the essence that is defined by the media access request received from the client device, wherein the VFS is further configured to dynamically provide grains and flows available to the client device while hiding, from the client, a form and location of the media essence to be delivered.

9. The system according to claim 8, wherein the VFS is further configured to impose the structure to include at least one programming statement to offload the at least one processing function to be executed by a computing device that is remote to the VFS before delivering the essence to the client device.

10. The system according to claim 9, wherein the at least one processing function comprises at least one of a video editing function or a mix effect function.

11. The system according to claim 8, wherein the VFS is further configured to define the media access request to include a CreateFile command that defines the format for the requested range of media content to be at least one of an MXF file format, a JPEG file format, a PNG file format and a WAV file format.

12. The system according to claim 11, wherein the VFS is further configured to dynamically and on-the-fly replace a portion of the media access request by an identification that specifies a location of a source of the identified byte ranges for the defined range of media content.

13. The system according to claim 12, wherein the VFS is further configured to configure the identification to carry at least one URL that is configured to access the location of the source to obtain the identified byte ranges for the defined range of media content.

14. The system according to claim 8, wherein the VFS is further configured to generate a pre-queue in response to the media access request that specifies a range of source content for the defined range of media content that is scheduled to be captured at a live event.

15. A system for dynamically providing media essence to a client device, the system comprising:

an input/output interface configured to receive a media access request from a client device that defines a range of media content at a defined format for the media essence to be delivered to the client device; and a virtual file system (VFS) coupled to the input/output interface and including a processor configured to implement instructions on a memory so as to provide an essence distribution controller that:

generates an essence containing file that includes a file name and extension that identifies byte ranges for the defined range of media content and the defined format for the delivering the essence to the client device;

dynamically builds the essence containing file to comprise a plurality of application programming interfaces (APIs) that are each configured to access at least a portion of the identified byte ranges for the defined range of media content;

imposes a structure on a portion of bytes contained in the essence containing file to define at least one processing function for the identified byte ranges to be executed before delivering the essence to the client device; and opens the essence containing file to access the identified byte ranges for the defined range of media content using the plurality of APIs and causing the at least one processing function to be executed on the accessed and identified byte ranges before delivering the essence to the client device, wherein the VFS is configured to dynamically provide grains and flows available to the client device while hiding, from the client, a form and location of the media essence to be delivered.

16. The system according to claim 15, wherein the at least one processing function is configured to transcode or transform the media content to the defined format for the essence that is defined by the media access request received from the client device.

17. The system according to claim 15, wherein the essence distribution controller is further configured to impose the structure to include at least one programming statement to offload the at least one processing function to be executed by a computing device that is remote to the VFS before delivering the essence to the client device.

18. The system according to claim 17, wherein the at least one processing function comprises at least one of a video editing function or a mix effect function.

19. The system according to claim 15, wherein the essence distribution controller is further configured to define the media access request to include a CreateFile command that defines the format for the requested range of media content to be at least one of an MXF file format, a JPEG file format, a PNG file format and a WAV file format.

20. The system according to claim 19, wherein the essence distribution controller is further configured to dynamically and on-the-fly replace a portion of the media access request by an identification that specifies a location of a source of the identified byte ranges for the defined range of media content.

21. The system according to claim 20, wherein the essence distribution controller is further configured to configure the identification to carry at least one URL that is configured to access the location of the source to obtain the identified byte ranges for the defined range of media content.

22. The system according to claim 15, wherein the essence distribution controller is further configured to generate a pre-queue in response to the media access request that specifies a range of source content for the defined range of media content that is scheduled to be captured at a live event.

* * * * *